(12) United States Patent
Wohllebe et al.

(10) Patent No.: US 6,428,041 B1
(45) Date of Patent: Aug. 6, 2002

(54) AIRBAG SYSTEM FOR A MOTOR VEHICLE

(75) Inventors: Thomas Wohllebe, Braunschweig; Ruprecht Sinnhuber, Gifhorn, both of (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/989,915

(22) Filed: Nov. 21, 2001

Related U.S. Application Data

(63) Continuation of application No. PCT/EP00/04484, filed on May 18, 2000.

(30) Foreign Application Priority Data

May 21, 1999 (DE) .......................................... 199 23 482
Oct. 29, 1999 (DE) .......................................... 199 52 231

(51) Int. Cl.$^7$ .............................................. B60R 21/26
(52) U.S. Cl. ........................ 280/736; 280/729; 280/742
(58) Field of Search ................................ 280/731, 729, 280/736, 739, 740, 742

(56) References Cited

U.S. PATENT DOCUMENTS

| 5,695,214 A | * | 12/1997 | Faigle et al. ............. 137/68.13 |
| 5,899,488 A |   | 5/1999  | Muller ..................... 280/728.3 |
| 5,957,490 A | * | 9/1999  | Sinnhuber ................... 280/735 |
| 6,039,346 A | * | 3/2000  | Ryan et al. ................. 280/736 |
| 6,322,102 B1 | * | 11/2001 | Rau et al. ................... 280/736 |

FOREIGN PATENT DOCUMENTS

| DE | 29721643 | 12/1997 |
| DE | 19816075 | 10/1999 |
| EP | 0812741  | 3/1997  |
| EP | 0836971  | 8/1997  |
| WO | 9965737  | 12/1999 |

* cited by examiner

Primary Examiner—Paul N. Dickson
Assistant Examiner—Faye M. Fleming
(74) Attorney, Agent, or Firm—Baker Botts LLP

(57) ABSTRACT

An airbag system includes a contact sensing element acted on by a gas generator to extend in the direction of airbag deployment. The contact sensing element carries a sleeve which initially covers gas openings on the generator and when the contact element is fully extended uncovers the openings to enable rapid airbag deployment. Deployment is slowed in the event the contact element encounters an obstacle, such as an out-of-position passenger.

23 Claims, 5 Drawing Sheets

AIRBAG SYSTEM FOR A MOTOR VEHICLE

This application is a continuation of PCT/EP00/04484 filed May 18, 2000.

BACKGROUND OF THE INVENTION

The invention concerns an airbag system for a motor vehicle.

Airbag systems for motor vehicles with one or more airbags are known in a very wide variety of embodiments and for a very wide variety of purposes. These systems can include sensor systems that measure the seat position of the protected occupant in relation to the relevant airbag and determine the time and extent of airbag deployment from the result of these measurements in order to trigger deployment of the airbag or airbags. DE 44 20 114 A1. discloses an airbag system for frontal and lateral protection in which the triggering device is an electronic control unit that detects the direction and intensity of a crash as well as the seat occupancy, and triggers the airbags individually or in combination as a function of the signals.

Also known is the use of pressure relief valves that stand in operative connection with a seat occupancy sensor system by means of a control unit in order to control the gas flow for the airbag as a function of the seat position of a vehicle occupant, and in particular to reduce said flow if the vehicle occupant is not in his predetermined seat position during a crash, but instead is in a forward-leaning (out-of-position) posture, or if a child restraint system is present on the relevant vehicle seat, or indeed if a child is present in the airbag's deployment zone (keep-out zone), so that the airbag does not act on the vehicle occupant with full gas pressure. It is also known to use multi-stage generators to control the gas flow in an airbag and thus the gas pressure therein.

Hence, from EP 0 836 971 A1 is known a passenger protection arrangement for a vehicle that has at least one airbag capable of being filled by an inflation device and that has a control unit connected to a sensor system for triggering and influencing the inflation device with regard to the filling characteristics of the airbag, wherein, in order to detect occupants in an out-of-position posture, a variety of elements are provided as components of the sensor system by means of which it is possible to detect the expansion behavior of a predetermined section of the airbag envelope. The signals generated by these elements can then be processed in the control unit to influence the inflation device. In this context, the elements can be designed as a tension member connected to the envelope section in the form of a cable, strap or hose associated with a displacement sensor in the form of a speed indicator. Moreover, magnetically active metal particles can also be associated with the tension member, in which case the displacement sensor here is then designed to detect magnetic asymmetries. Moreover, the tension member can have an associated pattern of stripes, which in turn is associated with an optical sensor for detecting the expansion behavior of the pattern of stripes. In addition, the elements can also take the form of a pressure sensing film or a piezoelectric element, either of which must be connected to the control unit by a signal transmission element. Furthermore, the elements can also take the form of a folding or expanding body, whose first end is attached to the predetermined envelope section and whose second end is attached to a stationary component, where the folding or expanding body has a reduced extension in a rest position and can be elongated in its extension by the inflation device. In addition, these elements can include at least one breakable element whose first end is attached to the folding or expanding body in the vicinity of a predetermined retaining section and whose second end is attached to a stationary component of the vehicle, so that the breakable element can be broken by the action of the inflation device to generate a signal, for example. This breaking of the breakable element can interrupt an electrical conductor to obtain a switching signal, by which means a control signal to alter the filling characteristics of the airbag can be generated by such methods as a characteristic curve in the control device if the signal is not detected within the predefined time period after triggering of the inflation device. Thus in every case the gas generator here is activated electronically as a function of a measured expansion characteristic of the airbag.

A similar construction is also known from EP 0 812 741 A1. This patent describes an airbag device in which the amount of gas delivered to an airbag by a filling device is accomplished by an unhindered forward movement of the airbag using a strip arranged in the interior of the airbag as a sensing medium. This strip is connected to the front portion of the airbag, and also is designed such that it advances along with the airbag. Here the travel distance and/or travel time is sensed, and an analysis unit is provided that determines the forward travel speed of the strip, and hence of the gas cushion traveling in the passenger compartment, and that controls the filling characteristics of the gas generator with an appropriate control signal. Hence, this is also a construction of an airbag system in which a gas generator can be appropriately controlled by means of an analysis and control unit.

A similar construction is also known from WO 99/65737, which was published during the priority period.

The airbag systems described above are thus all systems in which the gas stream blown into the airbag by the gas generator is electronically controlled with the aid of appropriate means positioned on the airbag for detecting and measuring the expansion behavior of the airbag. Such a construction is relatively complex and under some circumstances can also be subject to a certain susceptibility to malfunction.

In addition DE 198 16 075 A1, which was published during the priority period, discloses a safety apparatus for a motor vehicle with a multi-chamber airbag that has a tactile airbag with a contact function that can be quickly inflated with little energy, which can be inflated in the inflation area of at least one other airbag chamber, where it identifies by contact any obstacle that may be present and out of a normal position in this area. Connected to the tactile airbag is an electronic contact detection device that emits a control signal when contact occurs with the tactile airbag. The gas generator also includes a control device for the quantity of incoming gas that is connected to the contact detection device and that stops, or at least reduces, the gas generator's inflation function from continuing to inflate the airbag when it is acted upon by the control signal. Hence, the quantity of gas emitted by the gas generator is electronically controlled here as well.

Known from U.S. Pat. No. 5,899,488 is an arrangement wherein, to open the cover prior to deployment of the airbag, the gas generator first discharges into a cap or trough of a movable component associated with the gas generator on the side away from the cover, and this movable component is linked by a mechanism to the cover flap of the airbag cover. This discharge into the cap or trough displaces the component backward, away from the gas generator, while tearing the cover flaps so that the airbag exit opening is uncovered.

A gas connection to the airbag itself is not established until the airbag exit opening is fully uncovered, so that the airbag can be inflated unhindered in front of the airbag exit opening. The capability to detect an out-of-position passenger is neither provided nor possible with such an arrangement.

In order to be able to protect the vehicle occupants beyond the duration of the first vehicle impact and even through a secondary impact in the case of a complex accident event, DE 92 11 421 U1 proposes a gas bag restraint system with a gas bag having at least two chambers, where the first, larger chamber encloses the second and is delimited by a wall whose material has greater gas permeability than the material delimiting the second chamber. The first chamber protects the vehicle occupants during the primary impact but collapses rapidly, while the second, inner chamber remains filled long enough to form a protective gas cushion even during a secondary impact.

Moreover, DE 43 20 147 describes a safety device for a vehicle occupant that has an airbag and a device for moving the vehicle occupant from an out-of-position location into the restraint position prior to full activation of the airbag. This device can be equipped with a part that is moveable in the direction of the restraint position and is preferably cushioned, or with what is known as a position control airbag.

The object of the invention is to create an airbag system with at least one airbag as a restraint device wherein it is possible to adapt the airbag inflation behavior in a simple and reliable manner to an occupant seat position in order to reduce the danger of injury to a vehicle occupant, in particular a vehicle occupant who is out-of-position.

SUMMARY OF THE INVENTION

In the non-activated state of the airbag system the gas generator is surrounded by a sleeve that has or is comprised of a contact element as a detection device and that covers the gas generator's discharge openings such that, upon activation of the airbag system, the gas generator discharges a gas stream through the discharge openings into the sleeve so that the contact sensitive element can be pushed forward toward the airbag deployment zone as a keep-out zone. This accomplishes the result that the gas generator's discharge openings are fully uncovered by the sleeve for unhindered inflation of the airbag in the deployment zone at the full gas flow rate if the contact sensitive element does not encounter an obstacle in the airbag deployment zone. When the contact sensitive element encounters an obstacle in the airbag deployment zone, the sleeve is braked so that the discharge openings are not uncovered or are only partially uncovered as a function of the sensing path that has been traveled, by which means the flow of gas into the airbag can be stopped or delayed.

The contact sensitive element thus can be activated by released gas and is arranged such that it penetrates the airbag deployment zone to a predetermined limit, while carrying with it a portion of the undeployed airbag in contact therewith. Thus the contact sensitive element in operative connection with the gas generator controls the deployment of the airbag as a function of the sensing path in the airbag deployment zone in that, upon contacting an obstacle located in the sensing path, the further advance of the contact sensitive element is impeded and the gas flow into the airbag is thereby stopped or sharply reduced. This means that if a person or obstacle is present in the airbag deployment zone the deployment of the airbag is stopped or at least significantly slowed. If the contact sensitive element is able to advance to its predefined limit unimpeded, the path for the released gas mass flow into the airbag is fully uncovered and the airbag is deployed as intended. This simple mechanical control of the gas mass flow into the airbag after activation of the system significantly reduces the aggressiveness of the airbag, which also significantly reduces the danger for out-of-position vehicle occupants. A further significant advantage is that as a mechanical part the sleeve as a whole has a low failure rate and in addition facilitates an especially simple and rapid adaptation of the required gas flow rate to the relevant conditions. Accordingly, this design also operates very reliably on the whole. Moreover, such a design can also be manufactured relatively inexpensively.

In this context, the airbag can fully enclose the contact sensitive element in such a way that it contacts the sensing element on the passenger compartment side, both in the nonactivated state and when the sensing element advances into the airbag deployment zone during activation of the system.

The gas generator with its diffuser is advantageously arranged essentially in the longitudinal direction of the vehicle, and can be surrounded by a sliding sleeve that is closed on the passenger compartment side and thus can be acted upon and moved in the direction of the passenger compartment by released gas. The contact sensitive element is arranged on or integrated in this sliding sleeve. It determines the amount of gas released per time unit as a function of its location on the gas generator and thus on the diffuser. Its displacement path can be delimited in a simple manner by a stop. The stop can also be embodied as an electrical contact for ignition of a second generator stage that may also be provided. Alternatively, however, it can also be used as an electrical sensor for an algorithm in which, for instance, the time between a first contact and this contact is taken into consideration for triggering the second generator stage.

The contact sensitive element itself can be embodied as a contact sensitive cushion that in its rest position/non-activated position is integrated in the instrument panel cover and that advances into the airbag deployment zone like a bumper upon activation of the system. However, the contact sensitive element can also be a contact sensitive bag that is activated through the sliding sleeve and in turn moves the sleeve toward the airbag deployment zone by means of the action of the gas. In a simple manner, this contact sensitive bag is equipped with straps that attach to the sliding sleeve or a stationary support in order to limit its extension. For example, such a strap is attached to the stop for the sliding sleeve. The contact sensitive cushion or even the contact sensitive bag can be designed as a restraint device for the event of a secondary impact, while the sliding sleeve serves as a deformation element for the purpose of energy absorption.

In a preferred embodiment of the airbag system, the gas generator is enclosed by a housing in which is arranged the sliding sleeve that carries the contact sensitive element, and which is connected on the passenger compartment side with an equalizing chamber formed on the airbag on the gas generator side; said chamber is connected to the airbag via gas passages and/or valves and can be activated simultaneously with it. In the process, the equalizing chamber is filled with released gas from the region of the gas generator facing away from the passenger compartment, and the sliding sleeve is filled from the passenger compartment end of the gas generator. The equalizing chamber, as part of the airbag, deploys in the radial direction with respect to the gas generator and the contact sensitive element, and the airbag deploys later in the deployment process. If the contact sensitive element encounters an obstacle in the airbag deployment zone, thereby reducing the sensing path of the sliding sleeve, the deployment of the equalizing chamber is slowed and the airbag deployment is delayed. It is also possible for the latter not to take place, namely if pressure valves are arranged between the equalizing chamber and the airbag and a gas pressure surge to open them is absent.

If the airbag deployment zone is free and the contact sensitive element is unobstructed, the sliding sleeve fully uncovers the gas generator's diffuser; the equalizing chamber is explosively filled in a radial direction with respect to the occupants, and through it the airbag. The radial deployment of the equalizing chamber also has the advantage that, if necessary, the hands of a vehicle occupant that are not in the sensing path are pushed out of the airbag deployment zone. If all or part of the equalizing chamber is made of an elastic material, this will be stretched during filling. The "preloaded" material then releases its stored energy during the filling of the airbag and thus accelerates its deployment. An additional advantage of this embodiment is that the filled equalizing chamber serves as a restraint device for a possible second collision.

If the contact sensitive element is a contact sensitive bag, it may also be connected to the equalizing chamber by gas passages and/or valves, which accelerates filling of the equalizing chamber. The contact sensitive bag can also be connected additionally or exclusively to the airbag by valves that permit gas flow therein but only once a predetermined gas pressure has been exceeded. By this means, after an initial delay of the airbag deployment due to a smaller gas mass flow (obstruction in the airbag deployment zone), the airbag deployment is subsequently supported as a result of the gas overpressure that is built up. In the preferred embodiment described above, the thrust of the sliding sleeve is influenced and can be predetermined by the gap existing between the sleeve and the diffuser of the gas generator, and the area acted upon by gas in the axial direction.

In another very advantageous embodiment, the contact sensitive element, in the form of a contact bag, and the airbag can be connected to one another by a refill bag that deploys concentric to the gas generator and is made of an elastic material, wherein the connection between the contact bag and the refill bag is provided by pressure relief valves, and the connection between the refill bag and the airbag is provided by gas passages. In the event of activation of the gas generator, controlled for instance by the sliding sleeve described above, first the contact bag is filled, and then, when a predetermined overpressure is reached, the refill bag is filled through appropriate pressure relief valves and the airbag is filled through the refill bag and the gas discharge openings. During a collision, if the vehicle occupant falls into the deployed airbag, a portion of the gas is forced back from it into the refill bag, with the result that the gas pressure there rises, the pressure relief valves close, and the refill bag expands, absorbing energy. If the vehicle occupant moves back out of contact with the airbag, thereby relieving the load on it, the elastically expanded and thus energy-storing fabric forces some of the gas back into the airbag, releasing energy; the airbag is thereby refilled and can offer protection again during a possible subsequent secondary collision. In order to avoid gas loss, the airbag should be made of a fabric with the lowest possible gas permeability. To improve occupant protection, the contact sensitive bag can be provided on the interior of its side facing the gas generator with a coating that can be foamed by the propellant gas. After activation of the gas generator this coating forms an energy-absorbing layer that can act as an additional restraint device. In this embodiment, the gas generator can also be designed as a multi-stage generator that feeds additional propellant gas into the system for an imminent secondary collision after the first collision and assists the above-described refill process through an additional gas flow into the contact bag.

The air bag system can also advantageously have an auxiliary bag that can be filled by the gas generator through a pressure relief valve. This bag serves to accommodate the evolved gas that is not needed for deployment of the airbag and would otherwise escape, especially into the footwell. The pressure relief valve opens when the relevant contact sensitive element encounters an obstacle and the pressure of evolved gas in the gas generator consequently exceeds the valve's opening pressure.

As an alternative to the contact sensitive element arranged on a sliding sleeve, the contact sensitive element can also be a sock-shaped contact sensitive bag that is pulled over the gas generator and/or its diffuser from the passenger compartment side and is laid in coaxial folds and forms the sleeve, and which is enclosed by a separate and essentially bell-shaped diffuser with an opening facing toward the passenger compartment. This in turn is enclosed by the airbag and has a pressure relief valve on the side facing away from the passenger compartment. When the gas generator is activated, gas flows out of its passenger compartment end into the contact bag, which thereby advances in the direction of the airbag deployment zone. If it encounters an obstacle, the uncovering of further diffuser openings on the gas generator is stopped, and the still-folded contact sensitive bag fabric remains inside the separate diffuser where it closes the majority of the openings formed therein, so that the airbag enclosing the diffuser is deployed with only a low gas pressure and initially in a predominantly radial direction around the gas generator on account of the diffuser's bell-like shape. As a result, the gas pressure inside the separate diffuser rises such that the pressure relief valve opens and the gas, including the gas subsequently evolved by the gas generator, escapes.

The escaping gas can, however, be advantageously used for the system. If the pressure relief valve opens into an antechamber connected to the airbag, the gas can be used through this antechamber and with a delay for deploying the airbag, so that the latter is intentionally deployed in a delayed and thus less aggressive fashion.

The separate diffuser can also be connected, at its end facing away from the passenger compartment, to an auxiliary chamber provided on the airbag that stands in operative connection with a pivoting cover flap and that is arranged folded between the diffuser and the pivot mounting of the cover flap. When the gas generator is activated, the auxiliary chamber is immediately filled as well and triggers a pivoting motion of the cover flap so that the contact sensitive element can push into the airbag deployment zone. The flap is preferably preloaded in the direction of its closed position, for example by the application of spring force, so that a gas flow opening to the airbag is formed between the opened cover flap and the separate diffuser, the size of which is a function of the filling of the auxiliary chamber. If an obstacle is present in the airbag deployment zone, the gas flow into the auxiliary chamber stays reduced, and the gas flow opening remains closed or is small, so that the airbag either is not filled or is filled only slowly. If the contact sensitive element does not encounter an obstacle, the auxiliary chamber is filled with the full gas pressure and the gas flow opening is opened wide, so that the airbag is subsequently filled rapidly as well, at first deploying in primarily a radial direction due to the bell shape of the separate diffuser and only later in the axial direction.

Finally, the airbag system can have both an auxiliary chamber and an antechamber that are connected together.

The arrangement of the auxiliary chamber, and of the antechamber, in connection with a spring-loaded (preloaded) cover flap also accomplishes a refill function. When the vehicle occupant is restrained by the deployed airbag, he forces the gas back into the auxiliary chamber through the gas passages, and possibly also through the antechamber, during which process the gas flow opening widens. In the event of a second collision, this returned quantity of gas is immediately available, with the auxiliary chamber serving as a buffer in order to inflate the airbag as gently as possible. If a multi-stage generator is used in the airbag system, an additional stage thereof is ignited in the event of a second collision, triggered by a crash signal. To this end, the contact bag can be provided with electrical contacts formed by contact films in order to trigger the ignition of the second generator stage and possibly another additional stage.

The activation of the system can also proceed in such a manner that the ignition of a first stage initially inflates the auxiliary chamber and thereby opens the cover flap. Ignition of a second stage activates the contact bag. When an electrical contact attached to or built into the latter is closed, a third stage is ignited which deploys the airbag. Other means, for example ripcords, can also be provided instead of the contacts.

The invention is described below with the aid of example embodiments.

DESCRIPTION OF THE INVENTION

Figure 1:
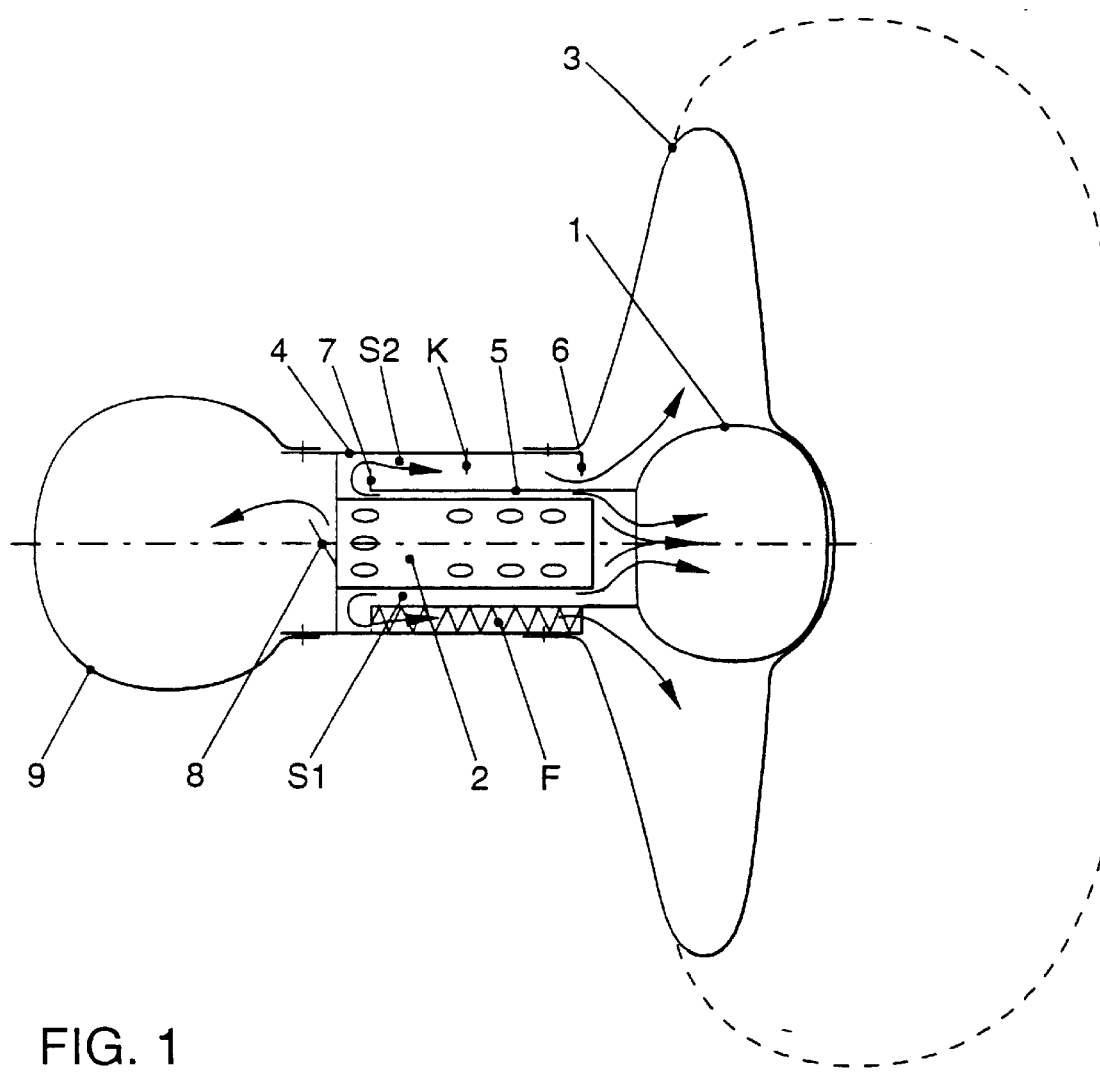
FIG. 1 shows an airbag system with a contact bag and an auxiliary bag.

FIG. 1 shows an airbag system with a contact bag 1 that serves as a means for detecting an obstacle in the airbag deployment zone; said contact bag 1, enclosed by airbag 3, is in operative connection with a gas generator 2, which may be a multi-stage generator, that has a diffuser and is arranged in the longitudinal direction of the vehicle, extending in the direction of airbag deployment. The airbag 3 is arranged on a housing 4 which encloses the gas generator 2 and a sliding sleeve 5 that surrounds the latter. The contact bag 1 is arranged on the passenger compartment side of the sliding sleeve. The housing has a coaxially arranged stop 6 for engaging a corresponding stop 7 located on the side of the sliding sleeve 5 that faces away from the contact bag to delimit the sliding path of the sleeve 5 and thus of the contact bag 1 in the airbag deployment zone. The sliding sleeve 5 is preloaded relative to the housing 4 by a compression spring F. Arranged on the housing 4 is a flexible electrical contact K that can be contacted by a second contact comprised of a contact film on the stop 7 in order to ignite a second generator stage. A gap S2 for gas passage is arranged between the sliding sleeve 5 and the housing 4. Located on the back of the gas generator 2 is a pressure relief valve 8 that opens into an auxiliary bag 9 arranged on the housing 4. The airbag system is shown in the activated state, with the contact bag 1 stopped on the sensing path and the airbag 3 contacting it on the side facing the passenger compartment, and with the deployed auxiliary bag 9. Additionally, on the end of the housing 4 facing the auxiliary bag there can be arranged valves through which gas can flow from the airbag 3 into the auxiliary bag 9 in the event of a collision between the vehicle occupant and the airbag 3; part of said gas flows back prior to a subsequent collision and is available for that eventuality.

The activation of the gas generator 2 releases gas into the gap S1 between the sliding sleeve 5 and the gas generator 2; on the one hand, this gas activates the contact bag 1 on the passenger compartment side and has pushed it (1) into the airbag deployment zone with the sliding sleeve 5, and on the other hand the gas has deployed the airbag 1 into an initial state via the gap S2. If the contact bag 1 has encountered an obstacle (not shown), its further advance is prevented, the sliding sleeve 5 still almost completely encloses the diffuser of the gas generator 2, and the gas pressure therein (2) rises. The rising gas pressure opens the pressure relief valve 8, and the auxiliary bag 9 becomes filled (FIG. 1). The airbag cannot be deployed further. If no obstacle is present in the sensing path, the auxiliary bag 9 will not have been filled, and the sliding sleeve will be pushed by the contact bag 1 with its stop 7 as far as the stop 6 on the gas generator 2; the second stage of the gas generator will be ignited by the passage of the contact K through the stop 7, and the airbag 1 will be fully deployed (dashed lines) while the pressure relief valve 8 remains closed.

The auxiliary bag 9 can also serve as a refill airbag for a multiple collision. The gas displaced from the airbag 3 by the vehicle occupant can escape into the auxiliary bag 9, and some of it can flow back into the airbag 3 after the load is removed. If throttling ports are arranged instead of valves, the auxiliary bag 9 can serve as an additional buffer if an obstacle is present in the keep-out zone.

Figure 2:
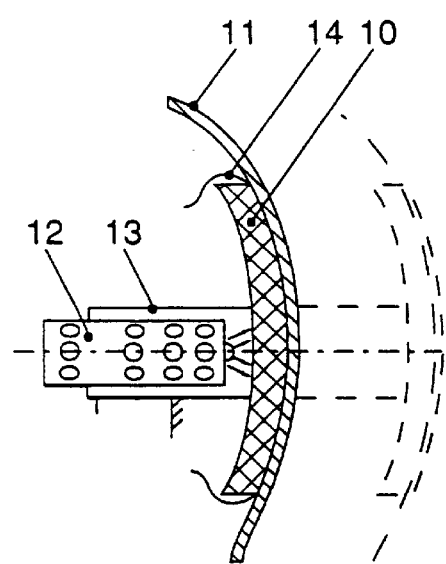
FIG. 2 shows a contact sensitive cushion.

FIG. 2 shows a contact element embodied as a contact cushion 10 that is integrated into the airbag cover 11 in the instrument panel. The contact cushion 10, like the contact bag in FIG. 1, is connected to a sliding sleeve 13 arranged on the gas generator 12, and advances into the airbag deployment zone when the airbag system (not shown in further detail) is activated. An indicated airbag 14 is carried along with the contact cushion 10 and is fully deployed in the absence of an obstacle.

Figure 3:
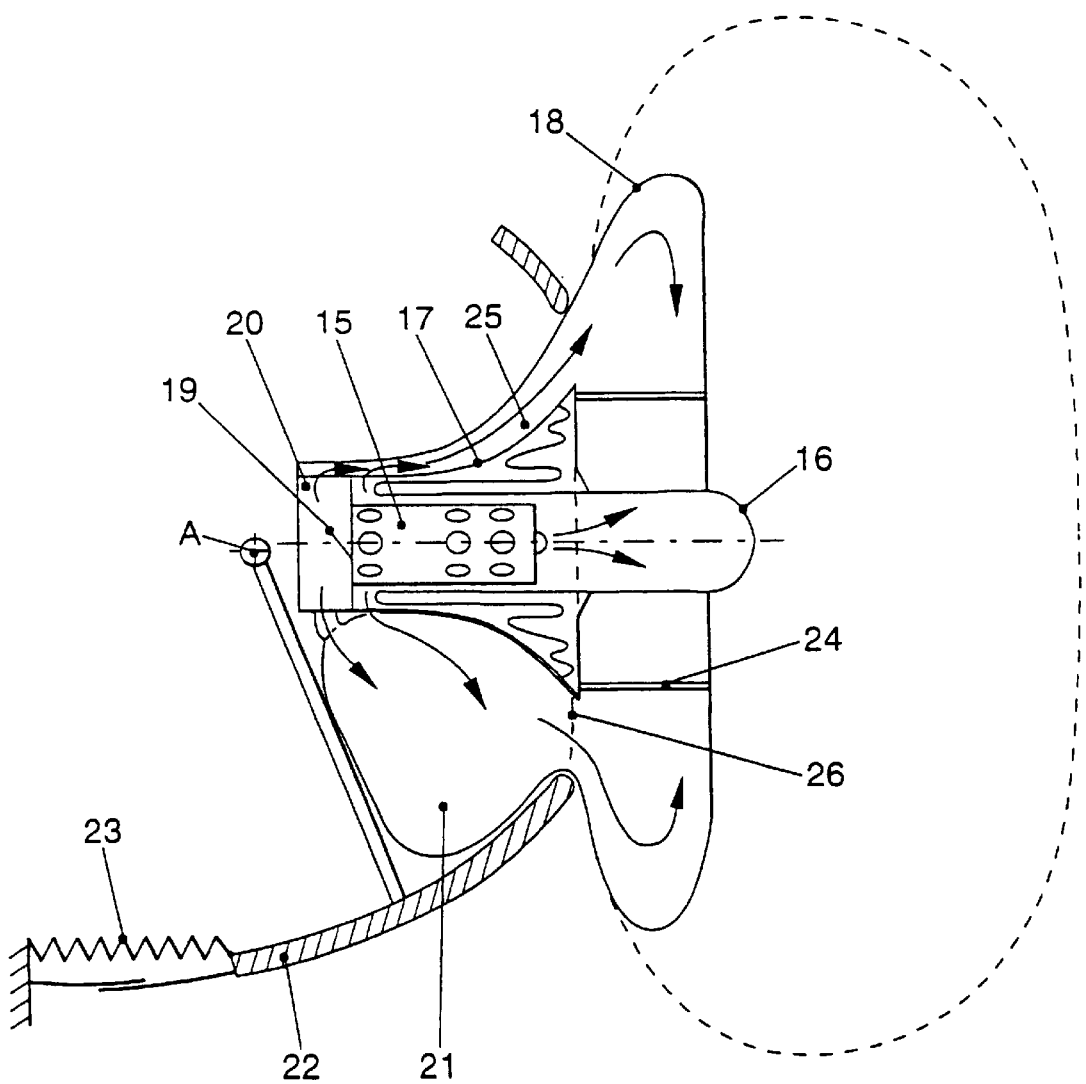
FIG. 3 shows an airbag system with a sock-shaped contact bag.

The embodiment shown in FIG. 3 has, as a contact element, a sock-shaped contact bag 16 that is pulled over the gas generator 15 from the passenger compartment side and is laid in coaxial folds. This contact bag 16 is enclosed by a separate, bell-shaped diffuser 17 whose opening faces toward the passenger compartment, and which in turn is enclosed by the airbag 18. The diffuser 17 has on the side facing away from the passenger compartment a pressure relief valve 19, which opens into an antechamber 20. Both the diffuser 17 at its end away from the passenger compartment and the antechamber 20 are connected to an auxiliary chamber 21 integrated in the airbag 18. This auxiliary chamber (21) is in operative connection with a pivoting cover flap 22 that is arranged perpendicular to the vehicle's longitudinal axis A and that is acted upon in the direction of its closed position by a compression spring 23. The airbag 18 is equipped with ripcords 24 and is connected to the diffuser 17 and the gas generator 15 via a gap 25.

When the gas generator 15 is activated, the evolved gas flows out of the region of the gas generator 15 facing away from the passenger compartment into the auxiliary chamber 21, which as a consequence of its expansion pivots the cover flap 21 about the axis A against the compression spring 23 and opens it. At the same time, gas flows out of the end of the gas generator 15 facing the passenger compartment into the contact bag 16, which thereby advances in the direction of the airbag deployment zone. In the event of a collision with an obstacle, the advance of the contact bag 16, and thus the further uncovering of the diffuser on the gas generator 15, is stopped. The gas flow into the auxiliary chamber 21 and also through the gap 25 into the airbag 18 remains reduced. The gas flow opening 26 between the auxiliary chamber 21 and the airbag 18 remains closed or is small, so that the airbag 18 either is not filled or is filled only slowly. This state is shown in FIG. 3. If the contact bag 16 does not encounter an obstacle, the diffusers of the gas generator 15 are fully uncovered and the auxiliary chamber 21 is filled at high gas pressure. This causes the gas flow opening 26 to be opened wide, so that the airbag 18 is subsequently filled rapidly and takes on the shape indicated by the dashed line. The bell-shaped diffuser provides for a primarily radial gas flow during the filling of the airbag 18.

Figure 4:
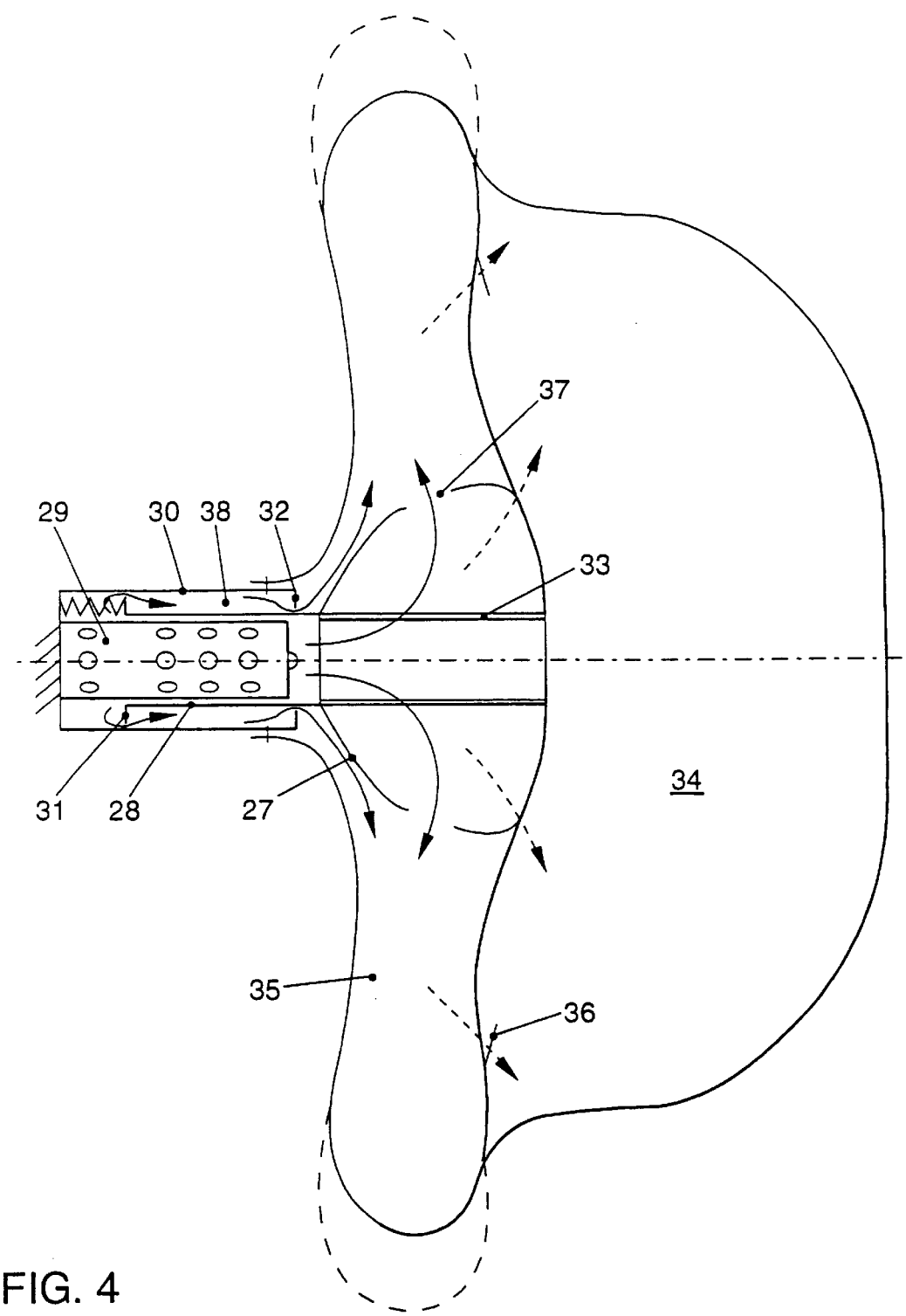
FIG. 4 shows an airbag system with an equalizing chamber in the airbag.

FIG. 4 shows the embodiment of an airbag system in accordance with the invention that has a contact bag 27 which acts together with a gas generator 29 via a sliding sleeve 28. The sliding sleeve 28 is enclosed by a housing 30. The two (28, 30) have stops 31 and 32 in order to limit the sensing path of the sliding sleeve 28 in the airbag deployment zone. In addition, the contact bag 27 is provided with straps 33 that limit its extension in the direction of the passenger compartment. The airbag 34 that encloses the contact bag 27 has, on the side facing the gas generator, an equalizing chamber 35 by which means the airbag 34 is arranged on the housing 30 and that is connected to the airbag 34 by valves 36 and to the contact bag 27 by gas passages 37. The equalizing chamber 35, part of which is made of an elastic material, can be filled with a radial gas stream via the gap 38 formed between the housing 30 and the sliding sleeve 28 and also via the gas passages 37, and can store energy when sufficient gas pressure is present (dashed lines).

If an obstacle is present in the airbag deployment zone then, in accordance with the principle of the above-described embodiments, the equalizing chamber 35 alone is initially deployed in the radial direction and with a low gas mass flow (arrows). The airbag 34 is only deployed when the gas pressure in the equalizing chamber 35 is so high that the pressure relief valves 36 open. If no obstacle is present in the aforementioned zone, the sliding sleeve 28 fully uncovers the gas generator's diffuser. The equalizing chamber 35 is explosively filled almost simultaneously with the contact bag 27, and the airbag 34 is also filled through the equalizing chamber 35 and the valves 36, in which process the stretched elastic regions of the equalizing chamber 35 assist the filling of the airbag 34 by displacing the gas contained in said equalizing chamber after the valves 36 open. FIG. 4 shows the fully deployed airbag 34. The radial deployment of the equalizing chamber 35 can act to improve protection in an angled frontal collision since the restraint region is enlarged in the radial direction in this embodiment and the vehicle occupant strikes the airbag away from its axial direction in an angled collision and is caught by the outer region of the equalization chamber 35. This embodiment also provides potential for protection in a subsequent collision. During the first collision, the vehicle occupant forces gas out of the airbag 34 through the valves 36 and back into the equalizing chamber 35, which expands. The gas remaining in the equalizing chamber 35 is then in part available for a subsequent collision in that a portion thereof is forced back into the airbag 34. The restraint function can additionally be purposefully influenced by the ignition of a second generator stage as a result of a crash signal due to a second collision.

Figure 5:
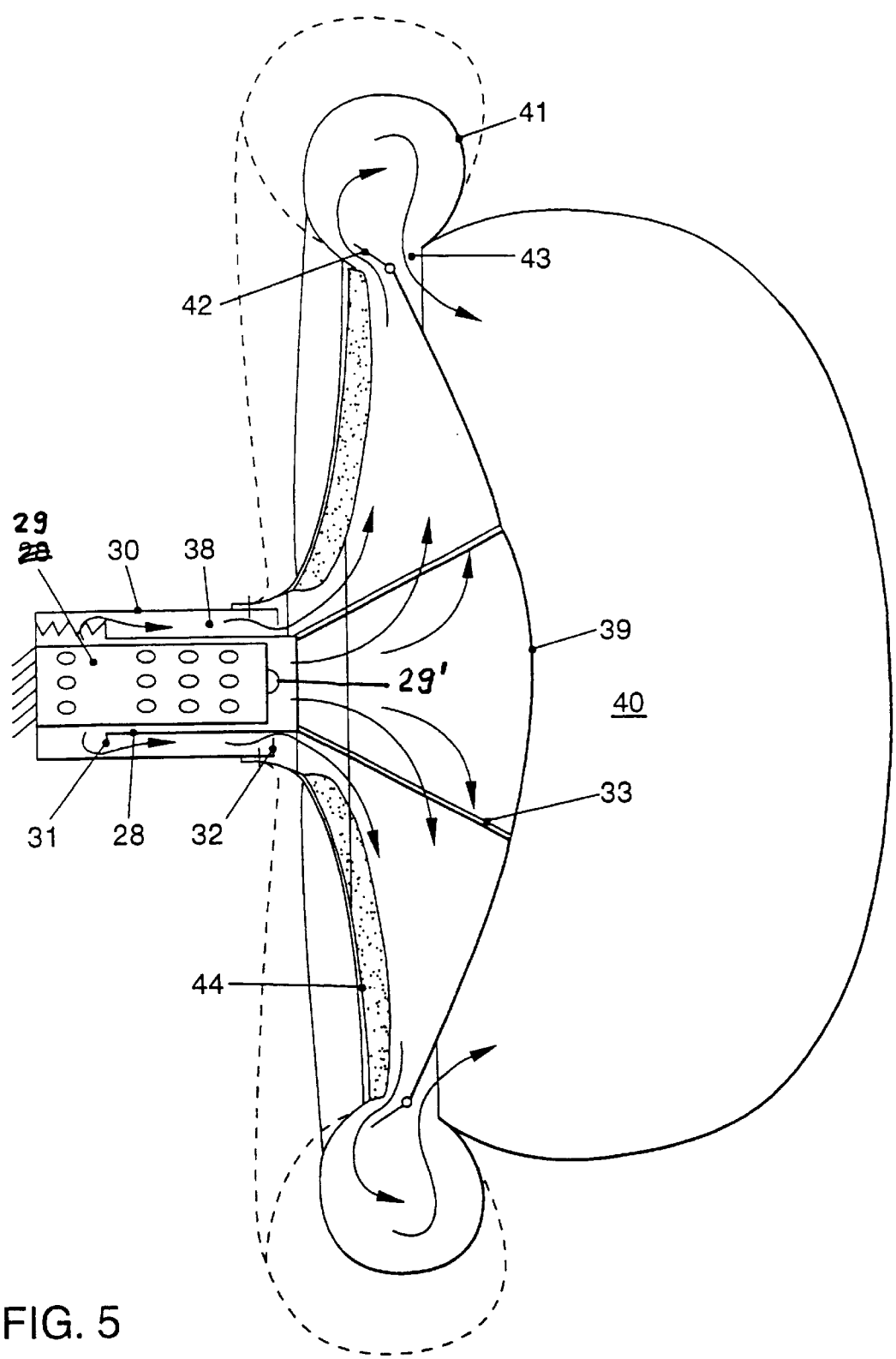
FIG. 5 shows an airbag system with a refill bag.

FIG. 5 shows an embodiment that has a contact bag 39 that acts together with a gas generator 29 by means of a sliding sleeve 28 preloaded by a tension spring. The sliding sleeve 28 is enclosed by a housing 30 on which is arranged the contact bag 39 and, behind it on the side of the passenger compartment, an airbag 40 made of a material impermeable to air in order to avoid gas loss to the greatest extent possible. The sliding sleeve 28 and the housing 30 have stops 31 and 32 in order to limit the sensing path of the sliding sleeve 28 in the airbag deployment zone. In addition, the contact bag 39 is provided with straps 33 attached to the sliding sleeve 28 that limit its extension in the direction of the passenger compartment. The contact bag 39 also has a coating 44 on the interior on the gas generator side that can be foamed by the propellant gas. The contact bag 39 and the airbag 40 are connected to one another by a refill bag 41 that deploys concentric to the gas generator 29 and is made of an elastic material that is impermeable to air, wherein the connection between the contact bag 39 and the refill bag 41 is provided by pressure relief valves 42, and the connection between the refill bag 41 and the airbag 40 is provided by gas passages 43.

The contact bag 39 can be filled, in particular in the radial direction, by gas released at the circumference of the gas generator 29 through the gap 38 formed between the housing 30 and the sliding sleeve 28 and also by gas released from the end of the generator (29). When sufficient gas pressure is present in the contact bag 39, hence when no obstacle is present in the deployment zone, then first the refill bag 41 is filled through the pressure relief valves 42, and then the airbag 40 is filled through the gas passages 43. When the contact bag 39 is filled, propellant gas flows over the coating 44, which is gradually foamed into an energy-absorbing layer and is available as an additional restraint means in a secondary collision.

If a vehicle occupant is pressed against the deployed airbag 40 during a primary collision, an overpressure arises therein which causes gas to be forced through the gas passages 43 into the refill bag 41, which consequently expands elastically (shown by dashed lines) with pressure relief valves 42 closed, storing energy. In the subsequent phase during which the vehicle occupant moves away from the airbag 40, the load on it is relieved. Due to this load release and the energy stored in the fabric of the refill bag 41, a part of the gas stored in the refill bag 41 is forced back from it into the airbag 40, thereby refilling it and making it available once again as a restraint means for a secondary collision, which as a general rule is less severe.

In a further embodiment that is not shown, the connection between the contact bag 39 and the refill bag 41 is structured by arranging additional pressure relief valves that open toward the contact bag 39 at a specified overpressure in the refill bag 41 such that in a secondary or multiple collision the contact bag 39 is also refilled from the refill bag 41 and serves as an additional restraint means to the airbag 40. By appropriately structuring the passage of gas between the refill bag 41 and the airbag 40 when using the means described above, the airbag system can be embodied in such a way that only the contact bag 39 serves as a restraint means for a secondary or multiple collision.

A so-called cold gas generator or hybrid gas generator, such as is described in documents DE 197 00 713, DE 196

Figure 6:
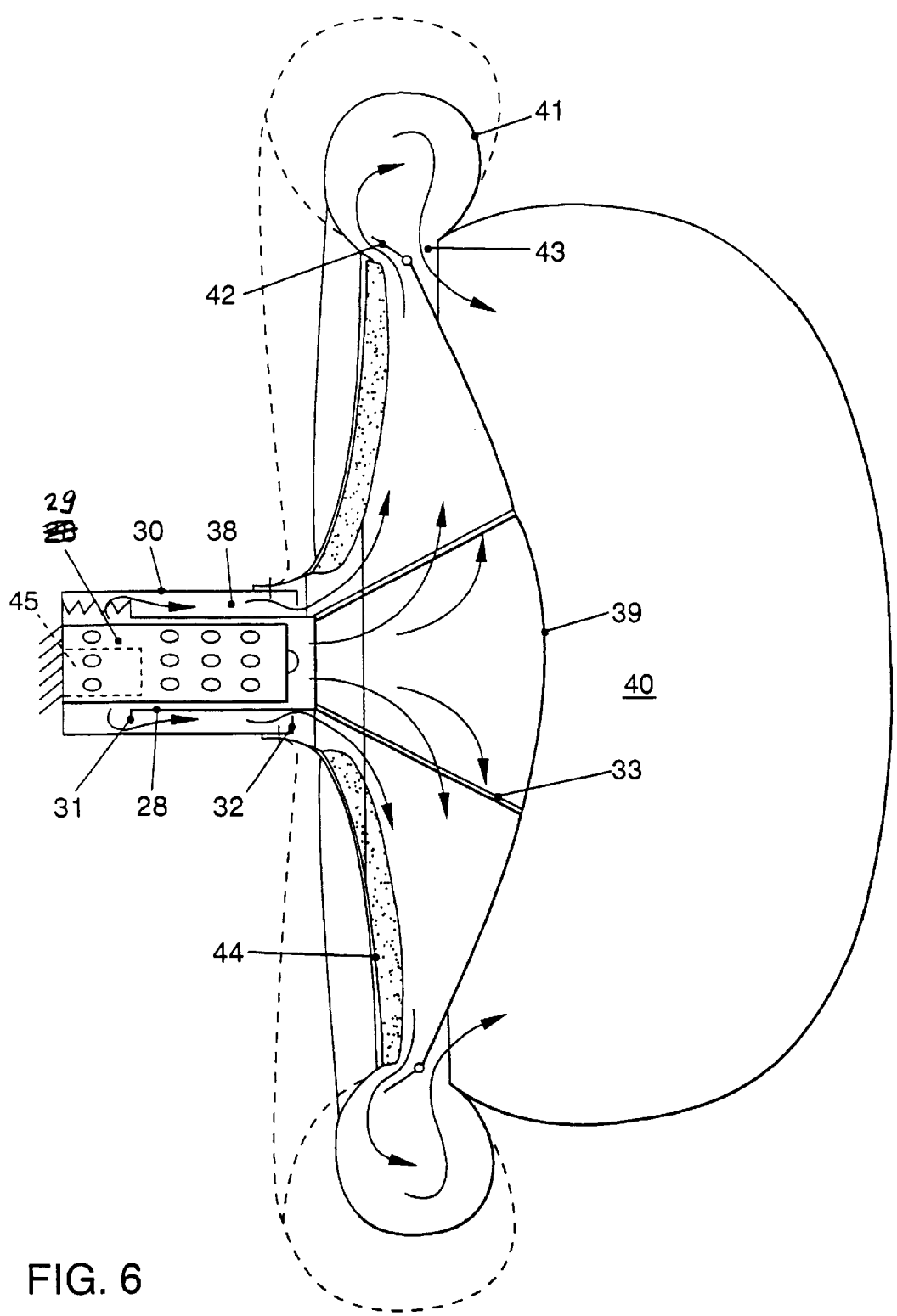
FIG. 6 shows another airbag system with a refill bag.

21 045, EP 0 449 506, US 5,516,144, EP 0 715 993 or DE 44 40 247 is preferred for filling, at least for airbags equipped with elastic sections (e.g., equalizing chamber 35 in FIG. 4 or refill bag 41 in FIG. 5). The air masses filled with such generators are sufficiently cool that, as a general rule, heat-elastic material (rubber, EPDM or the like) is not damaged by the gas stream, so that the relaxation of the main chamber of the airbag 34 can be counteracted by elastic self-restoration. Investigation by the inventor has shown that this gas mass return flow from the expanded elastic regions is large enough to keep the main chamber walls taut, so that a refilling with hot gas from a second generator requires only a small mass of gas, and thus additional impact protection for multiple collision events is provided at low cost and without a long time delay. Such an additional generator 45 (see FIG. 6) can be equipped with commercially available hot-gas propellant charges such as those that are already in use in the applicant's motor vehicles, for example. The use of cold-gas generators is likewise possible here.

While there have been described what are believed to be the preferred embodiments of the invention, those skilled in the art will recognize that other and further changes may be made thereto without departing from the spirit of the invention, and it is intended to claim all such changes and modifications as fall within the true scope of the invention.

We claim:

1. An airbag system for a motor vehicle, comprising:
   a gas generator having gas discharge openings;
   a contact sensing element having a sleeve covering said discharge openings in a non-activated condition, said contact sensing element and said sleeve being arranged to extend in a direction of air bag deployment in response to gas discharge through said discharge openings; and
   an airbag arranged to receive gas discharge from said discharge openings when said sleeve is fully extended to provide unhindered inflation of said airbag in said direction of air bag deployment;
   wherein said contact sensing element is arranged to stop extension of said sleeve, if it encounters an obstacles in said direction of airbag deployment, with said sleeve covering at least some of said discharge openings, thereby hindering inflation of said airbag.

2. An airbag system as specified in claim 1, wherein said airbag is arranged to enclose said contact sensing element in direction of airbag deployment.

3. An airbag system as specified in claim 1, wherein said gas generator extends generally in said direction of airbag deployment, wherein said sleeve is a sliding sleeve surrounding said gas generator and having a closed end in said direction of airbag deployment, wherein said contact sensing element is mounted on said sleeve, and wherein the sliding position of said sleeve on said gas generator controls the rate of gas supplied to said airbag.

4. An airbag system as specified in claim 3, wherein extension of said sleeve is limited by a stop.

5. An airbag system as specified in claim 4, wherein said stop includes an electrical contact for firing a second stage gas generator.

6. An airbag system as specified in claim 1, wherein said contact sensing element comprises a cushion, and wherein in said non-activated condition, said cushion is integrated into a cover of an instrument panel of said vehicle.

7. An airbag system as specified in claim 3, wherein said contact sensing element comprises a contact bag connected to said sliding sleeve and arranged to extend said sliding sleeve in said direction of airbag deployment.

8. An airbag system as specified in claim 7, wherein said contact bag is provided with straps for limiting extension of said contact bag.

9. An airbag system as specified in claim 1, wherein said airbag is provided with an equalizing chamber connected to said airbag by gas passages and arranged to expand in directions radial to said direction of airbag deployment simultaneous with said extension of said contact sensitive element.

10. An airbag system as specified in claim 7, wherein said contact bag is connected to one of said airbag or an equalizing chamber connected to said airbag via valves.

11. An airbag system as specified in claim 7, wherein said contact bag is connected to said airbag by a refill bag, which is deployable concentric to said gas generator, wherein a valve is provided between said contact bag and said refill bag and wherein a gas passage is provided between said refill bag and said airbag.

12. An airbag system as specified in claim 11, wherein said airbag is gas impermiable.

13. An airbag as specified in claim 11, wherein said contact bag is provided with a coating on the interior thereof in the direction opposite to said direction of airbag deployment with a coating selected to be foamed by gas from said gas generator.

14. An airbag system as specified in claim 1, further including an auxiliary bag connected to said gas generator by a pressure relief valve.

15. An airbag system as specified in claim 1, wherein said gas generator extends generally in said direction of airbag deployment and wherein said contact sensing element comprises a contact bag arranged over said gas generator in concentric folds and forming said sleeve, said contact being enclosed by a diffuser separate from said gas generator, said diffuser being enclosed in said airbag and having a pressure relief valve communicating with said gas generator at an end thereof opposite said direction of airbag deployment.

16. An airbag system as specified in claim 15, wherein said pressure relief valve connects said gas generator to an anti-chamber communicating with said airbag.

17. An airbag system as specified in claim 15, wherein said diffuser is connected at an end remote from said direction of airbag deployment to an auxiliary chamber of said airbag, said auxiliary chamber being arranged to pivot a cover flap about an axis perpendicular to said direction of airbag deployment into an open position.

18. An airbag system as specified in claim 17, wherein said cover flap is arranged to pivot in opposition to one of a force limiter and a compression spring.

19. An airbag system as specified in claim 17, wherein said gas generator is a multistage generator arranged to sequentially open said cover flap, extend said contact bag and deploy said airbag, wherein said contact bag is arranged to trigger the gas generator stage for airbag deployment.

20. An airbag system as specified in claim 1, wherein said gas generator comprises one of a cold gas generator and a hybrid gas generator.

21. An airbag system as specified in claim 1, wherein an additional gas generator is provided.

22. An airbag system as specified in claim 21, wherein said gas generator is one of a cold gas generator and a hybrid gas generator and wherein said additional gas generator is a hot gas generator.

23. An airbag system as specified in claim 22, wherein at least a portion of said system includes a bag having an elastic wall.

* * * * *